V. E. FREEMAN & L. P. WHITAKER.
MECHANISM FOR GRIPPING AND CARRYING GRAIN STALKS.
APPLICATION FILED NOV. 14, 1916.
1,228,200.
Patented May 29, 1917.
2 SHEETS—SHEET 1.
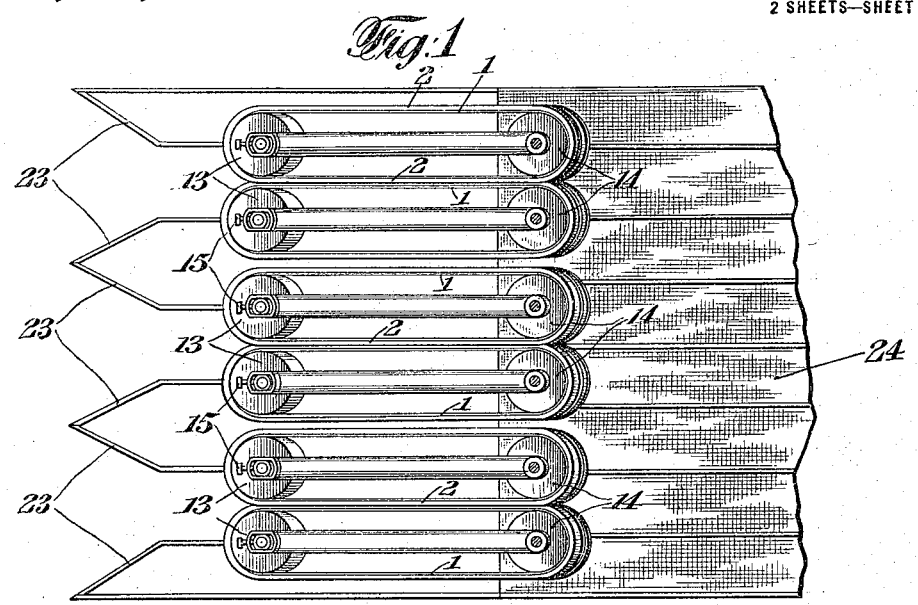
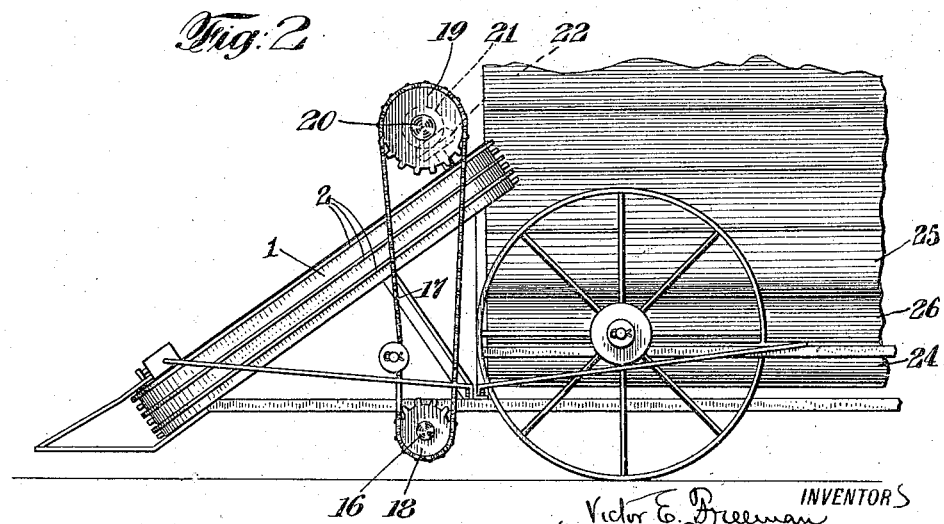

V. E. FREEMAN & L. P. WHITAKER.
MECHANISM FOR GRIPPING AND CARRYING GRAIN STALKS.
APPLICATION FILED NOV. 14, 1916.
1,228,200.
Patented May 29, 1917.
2 SHEETS—SHEET 2.
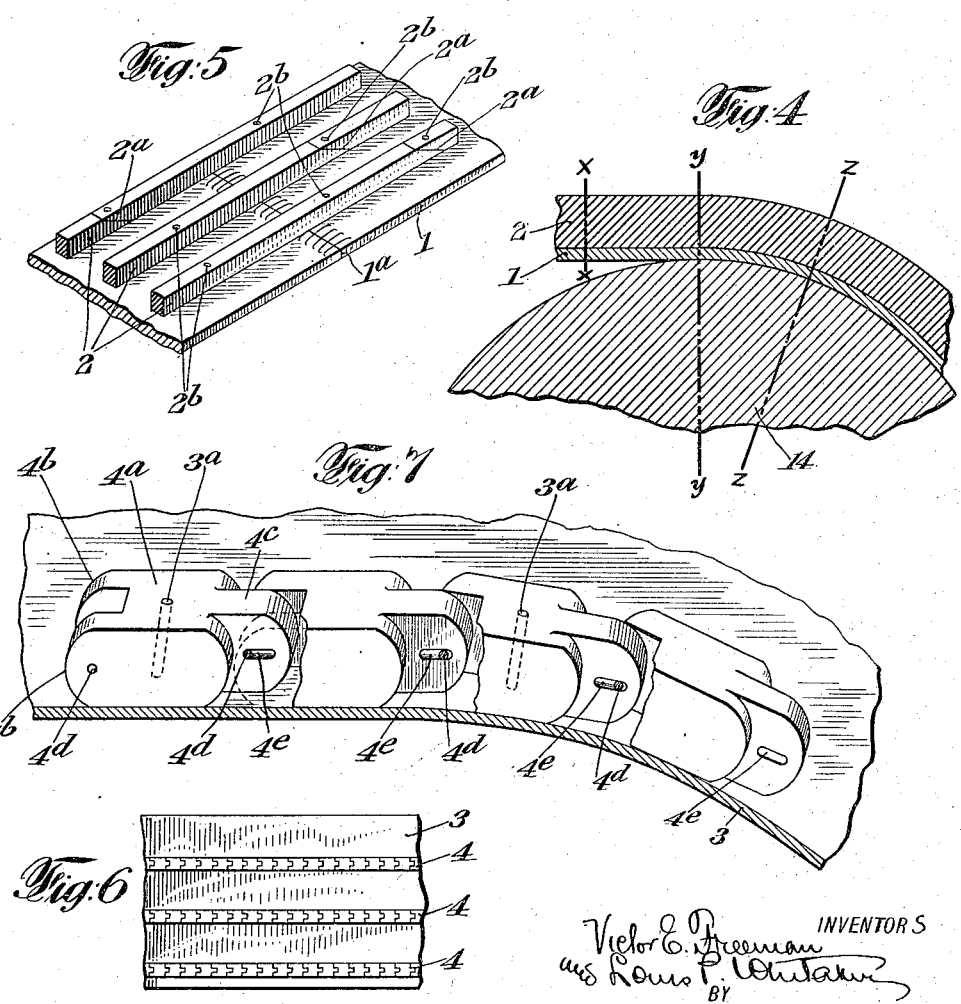

UNITED STATES PATENT OFFICE.

VICTOR E. FREEMAN, OF LONG BEACH, AND LOUIS P. WHITAKER, OF NEW YORK, N. Y.

MECHANISM FOR GRIPPING AND CARRYING GRAIN-STALKS.

1,228,200.  Specification of Letters Patent.  Patented May 29, 1917.

Application filed November 14, 1916. Serial No. 131,225.

*To all whom it may concern:*

Be it known that we, VICTOR E. FREEMAN and LOUIS PREVOST WHITAKER, citizens of the United States, residing at Long Beach, in the county of Nassau and State of New York, and borough of Manhattan, city, county, and State of New York, respectively, have invented certain new and useful Improvements in Mechanism for Gripping and Carrying Grain-Stalks; and we do hereby declare the following to be a full, clear, and exact description of the invention, such as will enable others skilled in the art to which it appertains to make and use the same.

Our invention consists in the novel features hereinafter described reference being had to the accompanying drawings which illustrate two forms in which we have contemplated embodying the invention and the said invention is fully disclosed in the following description and claims.

Referring to the said drawings:

Figure 1 represents a top plan view of a portion of a flax pulling machine provided with three pulling units.

Fig. 2 is a side elevation of a portion of the machine.

Fig. 3 is an enlarged sectional view taken through the opposed rollers of one pulling unit located at one end of the same and showing the pulling belts in section.

Fig. 4 is an enlarged horizontal sectional view of a portion of one of the belts and one of the supporting pulleys engaged thereby, the section being taken through one of the longitudinal ribs of the belt.

Fig. 5 is a perspective view of a portion of one of the belts illustrating one method of connecting the ends of the belt proper and of uniting the ends of the ribs to make them continuous.

Fig. 6 is a plan view of a pulling belt illustrating a modification.

Fig. 7 is an enlarged perspective view of a portion of the belt shown in Fig. 6, a part of the belt being shown in section, and one of the longitudinal ribs being illustrated in detail and partly broken away to show the manner in which it elongates in passing around a curved surface as the face of one of the supporting rollers.

In the harvesting of the flax plant for the purpose of securing the fiber from the stalks it is desirable to pull the stalks from the ground together with the roots of the plants instead of severing the stalks as is the custom in harvesting other grains, and as is customary in harvesting flax where the product sought is the flax seed and not the fiber. By pulling the flax a greater length of fiber is obtained and the subsequent handling of the plant in the production of fiber is facilitated where the plants are not severed, while the soil is left in better condition for another or other crops by the elimination of the roots of the flax plants therefrom. Ordinarily where flax is harvested for the production of fiber it is pulled by hand, but this method is slow, tedious, and painful, so that it is difficult, if not impossible, to employ it commercially in the United States as labor is better paid for less exacting forms of effort.

The object of our invention is to provide mechanism for gripping and carrying grain stalks such as the stalks of flax by means of which they may be pulled vertically from the ground so as to withdraw the roots, the stalks being carried by the pulling means upward and delivered at a suitable point. In carrying out our invention we employ a pulling unit which consists of a pair of endless belts of considerable width, each supported upon two rollers having vertically disposed axes, the said belts of each unit being inclined upward from front to rear, and having parallel opposed portions and the exterior face of each belt being provided with one or more longitudinally extending ribs, substantially co-extensive with the belts, and preferably endless, and disposed at intervals transversely of the belts, the longitudinal ribs of one belt being so located that they will lie between or intermesh with the corresponding ribs of the other belt throughout the parallel opposed portions of the two belts constituting the pulling unit, and the said ribs being capable of longitudinal expansion so that when they pass around the pulleys at each end of the pulling unit, the ribs may extend longitudinally to accommodate the greater arc of travel so as to facilitate the bending of the belt and materially reduce the power required for driving the same, and in the preferred form of our invention said ribs are made of material elastic in a longitudinal direction so that they may extend longitudinally in passing around the pulleys and be restored to normal tension throughout the substantially straight parallel portions thereof without materially varying the cross section of the rib, and also securing continuous uniform longitudinal surfaces throughout the length of the ribs.

We prefer to make these ribs of vulcanized india rubber, or gutta percha, or suitable india rubber or gutta percha compounds, or like material, which is not only elastic longitudinally but is slightly compressible, and is of a uniformly yielding nature throughout in all directions as such material will afford the firmest frictional gripping of the stalks without injuring the same, and the slightly adherent surface of the rubber or gutta percha composition will materially aid in preventing the stalks from pulling or slipping lengthwise between the belts. The longitudinal ribs of each belt are preferably spaced a greater distance apart than the width of the ribs of the opposing belt so that the opposing ribs of the respective belts do not come in contact with each other, and do not ordinarily come in contact with the opposed belt, but lie between and alternate with the ribs of the opposed belt leaving a clearance between adjacent ribs and between the outer faces of the ribs and the opposing belt, something after the manner of the intermeshing relation between the teeth of gear wheels when not under strain, so that when a stalk or stalks is or are grasped between two opposing belts, the ribs thereof will deflect the stalk or stalks into zigzag form as indicated in Fig. 3 of the drawing without exerting a direct clamping or crushing pressure on them, thus giving the belts a sufficient frictional hold on the stalks to pull them out of the ground and carry them upward to the point of delivery, without clamping them. The clearance between adjacent ribs of the opposed belts and between the outer faces of the ribs of one belt and the face of the opposed belt will accommodate one or more stalks and the pulling unit will, therefore, be as effective in pulling a single stalk where the grain is thin as it stands in the field, as where a plurality of stalks are grasped between the opposed portions of the belts.

The pulling unit thus formed is disposed at an angle to the surface of the ground, the front end being lower than the rear end, and power is applied to one of the rollers engaging each belt of the unit in such manner as to cause the parallel portions to move in unison from front to rear, in an upwardly inclined direction, while the unit itself is mounted upon a suitable frame so that it can be propelled forwardly over the ground at approximately the same speed as the rearward movement of the parallel portions of the belts.

In Fig. 1 we have illustrated a group of three units each comprising a pair of opposed belts, 1—1, of the kind described, mounted upon supporting rollers, 13—14, 13 being the front rollers, which are preferably provided with suitable means for tensioning the belts as set screws, 15, engaging movable bearings therefor, the rear rollers, 14, being preferably provided with suitable driving means. For example, each belt may be driven from a common driving shaft as 16, (see Fig. 2) by means of sprocket chain, 17, engaging a sprocket wheel, 18, on the driving shaft, and a sprocket wheel, 19, on a short shaft, 20, provided with a beveled gear, 21, engaging a beveled gear, 22, on the shaft of one of the rollers, 14. The machine will ordinarily be provided with suitable guards or gathering devices, 23, forward of the pulling units and the pulled flax may be delivered, for example, upon an endless carrier, indicated at 24, arranged to carry it laterally, and deliver it to a suitable binder by means of additional carriers, 25—26, in a well known way, or it may be delivered or bound in any other desired manner. The particular details of the machine are not comprised in our present invention which relates particularly to the construction of the pulling belts.

In Figs. 3, 4, and 5, we have shown our preferred form of pulling belt. This comprises a belt proper indicated at 1, composed of comparatively thin, flexible material, so as to bend readily in passing around the pulley, but having considerable stiffness and rigidity transversely of the belt. We may use for the belt material leather or rubber fabric or any other suitable material, but we prefer to employ a woven fabric belt, which is preferably treated with rubber or water-proof material so that it is practically non-stretchable and unaffected by either heat or moisture. Material of this kind is now on the market and ordinarily used for belting and this material is extremely stiff and rigid transversely while being very flexible and easily bent. Each of the belts is provided with a plurality of longitudinally extending parallel ribs, 2, which as before stated are preferably made of rubber or gutta percha or compositions including the same so treated as to provide a sufficient degree of longitudinal elasticity to enable the ribs to elongate in passing around the pulleys so that the belt, 1, can conform to the pulley substantially as if the ribs were not attached. Thus in Fig. 4 we have illustrated a section of one of the belts, 1, passing around a pulley, a portion of which is indicated at 14, and by means of dotted lines, $x$—$x$, $y$—$y$, $z$—$z$, we have indicated the manner in which the longitudinal rib, 2, expands lengthwise in passing around the pulley, thus the portion of the belt between the lines, x—x, y—y, indicates a given unit of length, say one inch of the belt when in a straight line, and the portion between the lines y—y and z—z indicates a similar unit of length of the belt, after it has bent around the pulley. It will be seen that the outer portions of the rib, 2, are considerably elongated, thus permitting the belt, 1, to follow the pulley on its own pitch line as if the rib were not present, and greatly reducing the power required to bend the belt and drive the same.

It will also be seen that the rib expands and contracts longitudinally without material variation of its cross section and without interfering with its presenting at all times smooth continuous exterior surfaces. The belt, 1, may be made endless, if desired, and found convenient, or it may be joined by a suitable lacing, indicated at $1^a$, for example, in Fig. 5, or the ends of the belt may be connected in any other suitable manner. Whether the belt itself is made endless or not, we prefer to make the ribs continuous although this is not absolutely essential. We prefer, however, to bevel the meeting ends of the ribs, as indicated at $2^a$—$2^a$, in Fig. 5, and bring them together with an overlapping joint, and to arrange these joints so that they are preferably out of line with each other, and also out of line with the joining of the ends of the belt, 1, where the belt itself is not made endless. We prefer to cement the rubber ribs 2, to the belt, preferably with rubber cement, and to also cement the overlapping beveled portions, $2^a$, to each other and if found desirable we may also further secure the ribs to the belt by means of small rivets, indicated at $2^b$, passing through the ribs and belt, and also preferably passing through the overlapping beveled portions, $2^a$, as indicated in Fig. 5. Each of the pulling belts may have as many longitudinal ribs as desired, and they may have the same or different number as preferred. In the belts shown herein, three ribs are provided on each belt, the two end ribs being located at different distances from the edges of the belt and so arranged that both of a pair of opposing belts can be made from the same stock, one being inverted with respect to the other, although this is not essential. In some instances we may use belts having two and three ribs respectively or three and four ribs respectively, or five and six ribs respectively, for example.

The use of the rubber ribs herein described not only provides for the longitudinal expansion and contraction of the rib but permits the belt to pass around the pulley without undue strain and power, but obviously the ribs will also be more or less elastic transversely so that they will be less liable to injure the stalks of the flax or other grain than an inelastic rib, and moreover the surface of the rubber strips is such that an increase in the frictional engagement between the ribs and stalks is obtained over other material. This enables us to use ribs of less height than would otherwise be desirable without lessening the frictional hold of the intermeshing ribs on the stalks. In some instances we may employ ribs which are extensible longitudinally although not composed of elastic material. For example, in Figs. 6 and 7 we have illustrated a modified form of belt in which the belt is indicated at 3, and the ribs which are indicated at 4 are formed of a plurality of connected longitudinally alined blocks $4^a$ of wood, metal, or other suitable material shaped something like the links of a chain, and each provided at one end with bifurcated portions, $4^b$, and at the other end with a centrally located projecting portion, $4^c$, adapted to pass between the bifurcated portions of the adjacent link or block. These links are connected preferably by pins or rivets, $4^d$, extending through holes in the bifurcated portions of each link and engaging longitudinally disposed slots, $4^e$, in the central projection, $4^c$, of the adjacent link or block, the construction being such that when the belt is traveling in straight line the pins, $4^d$, are at the inner ends of the slots, and when the belt is passing around the pulleys the ribs elongate by a slight longitudinal separation of the blocks or links which carries the pins, $4^d$, toward the other ends of the slots, $4^e$, thus permitting the elongation of each rib.

This construction also enables the belt to bend easily around the pulley on its own pitch line without being retarded by the ribs and also a minimum of driving power to propel the belts and pulleys. Each of the links of the ribs may be secured to the belt, 3, by means of a central rivet, $3^a$, if desired, but we have found that it is only necessary to secure certain of the links or blocks, as for example, every other one as shown in Fig. 7, the intermediate links or blocks being held in position by the cross rivets, $4^d$. It is obvious that when the belt is in a straight position for pulling the several rows of these links or blocks form longitudinal ribs of the desired cross section, and will operate in substantially the same manner as hereinbefore described for the gripping and pulling of stalks, and said ribs may also be made endless, if desired, as will be obvious.

What we claim and desire to secure by Letters Patent is:

1. Mechanism for gripping and carrying grain stalks comprising a pair of endless belts having opposed parallel portions, each of said belts comprising a broad band of flexible material provided with a plurality of longitudinally extensible, longitudinally disposed ribs projecting from its exterior surface, said ribs being substantially coextensive longitudinally with the belt and the ribs of one belt being out of alinement transversely with and intermeshing with those of the other belt, and out of contact with the surface of the opposing belt, throughout the parallel opposed portions of said belts, and means for driving said belts so as to cause the parallel opposed portions to move in the same direction and at the same speed.

2. Mechanism for gripping and carrying grain stalks comprising a pair of endless belts having opposed parallel portions, each of said belts comprising a broad band of flexible material provided with a plurality of longitudinally elastic, longitudinally disposed ribs projecting from its exterior surface, said ribs being substantially co-extensive longitudinally with the belt and the ribs of one belt being out of alinement transversely with and intermeshing with those of the other belt, and out of contact with the surface of the opposing belt, throughout the parallel opposed portions of said belts, and means for driving said belts so as to cause the parallel opposed portions to move in the same direction and at the same speed.

3. Mechanism for gripping and carrying grain stalks comprising a pair of endless belts having parallel opposed portions each of said belts comprising a band of material substantially inflexible in directions parallel to the planes of its inner and outer faces, but flexible in directions transversely of said planes, and provided with a plurality of longitudinally disposed ribs formed of a composition including rubber and being elastic longitudinally and transversely, the ribs of one belt being out of alinement transversely with and intermeshing with those of the other belt, and being out of contact with the face of the opposed belt throughout the parallel portions thereof, and means for driving said belts so as to cause the opposed parallel portions thereof to move in the same direction and at the same speed.

4. Mechanism for gripping and carrying grain stalks comprising a pair of endless belts having parallel opposed portions each of said belts comprising a band of material substantially inflexible in directions parallel to the planes of its inner and outer faces, but flexible in directions transversely of said planes, and provided with a plurality of longitudinally disposed ribs formed of a composition including rubber, and being elastic longitudinally and transversely, the ribs of one belt being out of alinement transversely with and intermeshing with those of the other belt, and being out of contact with the face of the opposed belt throughout the parallel portions thereof, said ribs each having their ends joined to make them endless, the joints of said ribs being out of alinement with each other, and out of alinement with any line of joining of the belt material.

In testimony whereof we affix our signatures.

VICTOR E. FREEMAN.
LOUIS P. WHITAKER.

Copies of this patent may be obtained for five cents each, by addressing the "Commissioner of Patents, Washington, D. C."